United States Patent
Chacko

(10) Patent No.: US 8,062,385 B2
(45) Date of Patent: Nov. 22, 2011

(54) SOLID ELECTROLYTIC CAPACITOR WITH IMPROVED VOLUMETRIC EFFICIENCY METHOD OF MAKING

(75) Inventor: Antony Chacko, Greer, SC (US)

(73) Assignee: Kemet Electronics Corporation, Greenville, SC (US)

( * ) Notice: Subject to any disclaimer, the term of this patent is extended or adjusted under 35 U.S.C. 154(b) by 466 days.

(21) Appl. No.: 12/029,538

(22) Filed: Feb. 12, 2008

(65) Prior Publication Data

US 2009/0199378 A1 Aug. 13, 2009

(51) Int. Cl.
*H01G 9/00* (2006.01)
(52) U.S. Cl. .................................................. 29/25.03
(58) Field of Classification Search ................ None
See application file for complete search history.

(56) References Cited

U.S. PATENT DOCUMENTS

| | | | |
|---|---|---|---|
| 6,380,577 B1 | 4/2002 | Cadwallader | |
| 6,409,776 B1 * | 6/2002 | Yan et al. | 29/25.03 |
| 6,541,302 B2 | 4/2003 | Huber et al. | |
| 6,699,265 B1 * | 3/2004 | O'Phelan et al. | 607/1 |
| 6,905,925 B2 | 6/2005 | Mosley | |
| 7,016,180 B2 | 3/2006 | Yoshihara et al. | |
| 7,161,797 B2 | 1/2007 | Vaisman et al. | |
| 7,247,178 B2 * | 7/2007 | Hirano et al. | 29/25.03 |
| 2003/0169561 A1 | 9/2003 | Ohya et al. | |

FOREIGN PATENT DOCUMENTS

| | | |
|---|---|---|
| JP | 2001-102252 A | 4/2001 |
| JP | 2001-257130 A | 9/2001 |
| JP | 2002-110459 A | 4/2002 |
| JP | 2002-25860 A | 8/2003 |
| JP | 2003-68588 A | 11/2003 |
| WO | WO 2006/024257 | 3/2006 |

* cited by examiner

*Primary Examiner* — Alexander Ghyka
*Assistant Examiner* — Seahvosh Nikmanesh
(74) *Attorney, Agent, or Firm* — Joseph T. Guy; Nexsen Pruet, LLC

(57) ABSTRACT

A method of forming a capacitor includes the steps of:
forming an anode with an anode wire extending there from;
forming a dielectric on the anode;
forming a cathode layer on the dielectric;
providing a substrate comprising at least one via and at least two connectors;
inserting the anode wire into a first via;
forming an electrical connection between the anode wire and a first connector of the connectors; and
forming an electrical connection between the cathode layer and a second connector.

34 Claims, 4 Drawing Sheets

SOLID ELECTROLYTIC CAPACITOR WITH IMPROVED VOLUMETRIC EFFICIENCY METHOD OF MAKING

BACKGROUND

The present invention is related to an improved method of packaging a solid electrolyte capacitor and an improved capacitor formed thereby. More specifically, the present invention is related to improving the volumetric efficiency of a capacitor by an improved method of positive and negative termination in a capacitor and an improved capacitor formed thereby.

The construction and manufacture of solid electrolyte capacitors is well documented. In the construction of a solid electrolytic capacitor a valve metal serves as the anode. The anode body can be either a porous pellet, formed by pressing and sintering a high purity powder, or a foil which is etched to provide an increased anode surface area. An oxide of the valve metal can be electrolytically formed to cover all surfaces of the anode and to serve as the dielectric of the capacitor. A solid cathode electrolyte is formed on the dielectric and is typically chosen from a very limited class of materials including manganese dioxide or electrically conductive organic materials such as 7,7',8,8'-tetracyanoquinodimethane (TCNQ) complex salt, or intrinsically conductive polymers, such as polyaniline, polypyrrole, polyethylenedioxythiophene and their derivatives. An important feature of the solid cathode electrolyte is that it can be made more resistive by exposure to high temperatures. This feature allows the capacitor to heal leakage sites by Joule heating. In addition to the solid electrolyte the cathode of a solid electrolyte capacitor typically comprises several layers which are external to the anode body. In the case of surface mount constructions these layers typically include: a carbon layer; a layer containing a highly conductive metal, typically silver, bound in a polymer or resin matrix; a conductive adhesive layer such as silver filled adhesive; and a highly conductive metal lead frame. The various layers connect the solid electrolyte to the outside circuit and also serve to protect the dielectric from thermo-mechanical damage that may occur during subsequent processing, board mounting, or customer use.

Continued efforts are directed towards increasing the volumetric efficiency of solid electrolytic capacitors. The volumetric efficiency of an electrolytic capacitor is typically defined as the ratio of the active capacitor volume to the volume of the entire molded capacitor package. The anode leadwire typically extends axially from the anode to a lead frame and ultimately to an external termination. This assembly occupies a significant amount of space inside the capacitor package.

As the volumetric efficiency of capacitors has increased the parasitic resistance has also increased. This has led to a particular conundrum in the industry with much effort being spent attempting to decrease the size of a capacitor without increasing parasitic resistance. These goals have previously been considered contradictory.

U.S. Pat. No. 7,161,797 describes a method for increasing volumetric efficiency. This method requires careful cutting of an encapsulated pellet followed by formation of an electrode on the exterior of the encapsulated body. While advantageous for volumetric efficiency it is desirable to have more contact between the anode wire and conductor than that afforded by the end of the anode wire. An exterior termination is undesirable in many applications, particularly, when many components are closely packed as would be the case when volumetric efficiency is a concern.

The present application provides a capacitor, and method of making the capacitor, wherein the volumetric efficiency is improved without significant negative impact to parasitic resistance.

SUMMARY

It is an object of the present invention to provide an improved capacitor.

A particular feature of the invention is a capacitor with improved volumetric efficiency.

It is another object of the present invention to provide a capacitor comprising the improved volumetric efficiency wherein the capacitor has improved properties owing to the improved positive and negative terminations.

It is another object of the present invention to provide an improved method for manufacturing capacitors.

It is another object of the present invention to provide a capacitor with improved conduction by decreasing the conduction path between the silver layer and the negative termination pads.

It is another object of the present invention to provide a capacitor with reduced ESL by reducing the loop area between the negative and the positive terminations.

A particular feature of the present invention is the ability to provide the improvements with minor changes in the manufacturing and with improved yields due to the decrease in the amount of unusable material which typically results from either poor adhesion or poor conductivity between layers.

These and other advantages, as will be realized, are provided in a method of forming a capacitor. The method includes the steps of:
forming an anode with an anode wire extending there from;
forming a dielectric on the anode;
forming a cathode layer on the dielectric;
providing a substrate comprising at least one via and at least two traces;
inserting the anode wire into a first via;
forming an electrical connection between the anode wire and a first trace of the traces; and
forming an electrical connection between the cathode layer and a second trace.

Yet another embodiment is provided in a method of forming a capacitor. The method includes the steps of:
forming an anode with an anode wire extending there from;
forming a dielectric on the anode;
forming a cathode layer on the dielectric thereby forming a capacitive element;
providing a substrate comprising at least one via and at least two traces;
mounting the capacitive element on the substrate with the anode wire extending into a first via; and
forming an electrical connection between the anode wire and a first trace.

Yet another embodiment is provided in a method of forming an electronic component. The method includes the steps of:
forming a capacitor by:
forming an anode with an anode wire extending there from;
forming a dielectric on the anode;
forming a cathode layer on the dielectric thereby forming a capacitive element;
providing a substrate comprising at least one via and at least two traces;

mounting the capacitive element on the substrate with the anode wire extending into a first via of said at least one via; and forming an electrical connection between the anode wire and a first trace;

mounting the capacitor on a substrate with the anode wire parallel to the substrate wherein the substrate comprises an anode trace and a cathode trace;

electrically connecting the first trace to the anode trace; and electrically connecting the second trace to the cathode trace.

DETAILED DESCRIPTION

The present invention is directed to a capacitor and method of making a capacitor. The invention provides capacitance with improved volumetric and manufacturing efficiency without the expected increase in equivalent series inductance (ESL) and equivalent series resistance (ESR).

The invention will be described with reference to the various figures forming an integral part of the present application. Throughout the various figures similar elements will be numbered accordingly.

Figure 1:
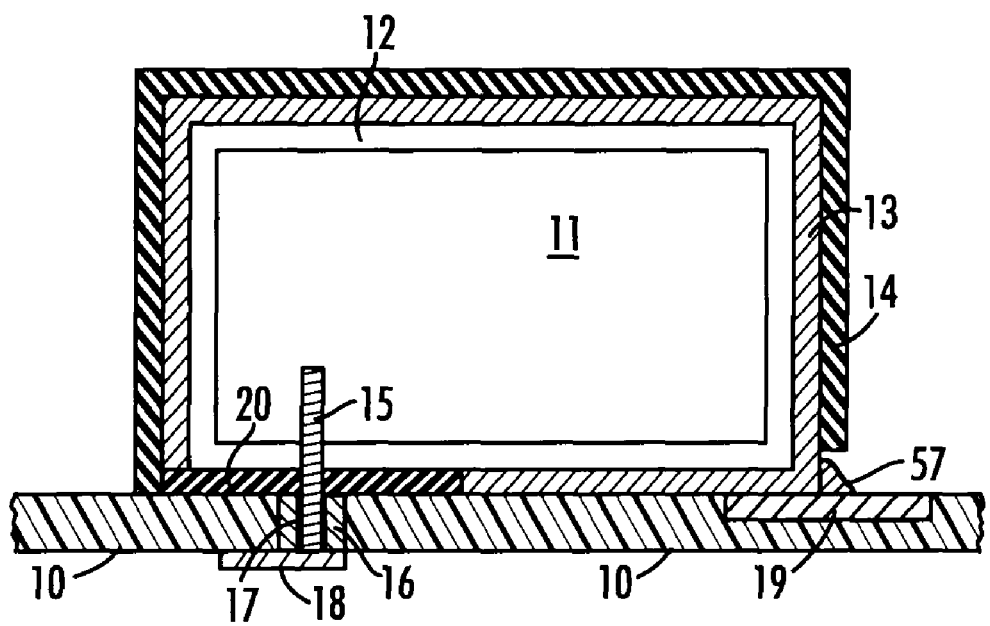
FIG. 1 is a cross-sectional schematic view of an embodiment of the invention.

An embodiment of the invention will be described with reference to the cross-sectional schematic view of FIG. 1. In FIG. 1 capacitance is provided by a capacitor couple mounted to a substrate, 10. The capacitor comprises an anode, 11. On the exterior of the anode is a dielectric, 12. The dielectric preferably covers the entire surface of the anode, however, sections of the anode may not have dielectric with the proviso that subsequent cathode layers are not in electrical contact with the anode as would be readily understood by one of skill in the art. Near complete coverage of the anode by the dielectric is desired for manufacturing simplicity. A conductive layer, 13, is applied to the dielectric layer, 12. The conductive layer forms the cathode. As would be readily realized two conductive layers separated by a dielectric layer provides the functionality referred to as capacitance. An optional insulating layer, 14, encases at least a portion of the capacitor.

The capacitor is mounted on the surface of the substrate as will be more fully realized from further description herein. An anode wire, 15, which is typically integral to the anode by compression extends from the bottom of the anode and directly into a via, 16, of the substrate, 10. By having the anode wire extend directly from the anode into the via the necessity for a lead frame, or riser, is eliminated as typically employed in the art thereby significantly decreasing the path length for current flow. Therefore, the capacitor can be manufactured without a lead frame attachment. Excluding the step of attachment to a lead frame increases manufacturing efficiency and decreases manufacturing cost. A conductive adhesive, 17, in the via electrically connects the anode wire to a connector such as an anode trace, 18, on the substrate opposite the capacitor. The cathode, 13, is bonded to a second connector such as a cathode trace, 19, by a conductive adhesive or equivalent bonding technique, 57. In this embodiment the cathode trace is on the same side of the substrate as the capacitor. An optional, but preferred, insulator, 20, insures that the anode wire and cathode are electrically insulated from each other and provides a flat bottom surface for the capacitor.

Figure 2:
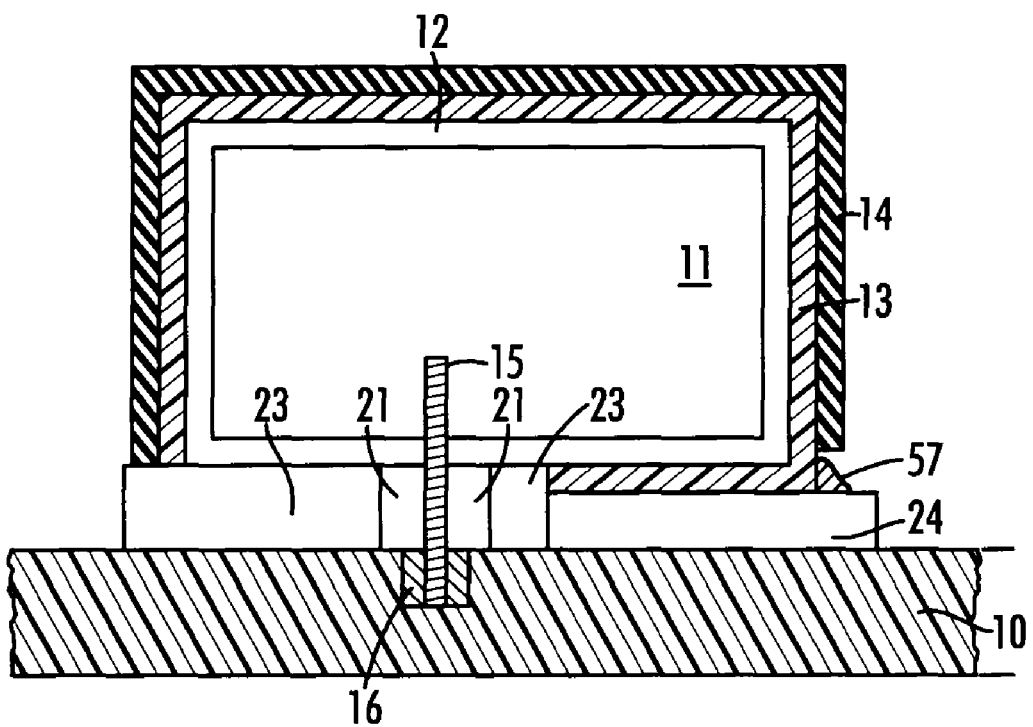
FIG. 2 is a cross-sectional schematic view of an embodiment of the invention.

An alternative embodiment is illustrated in FIG. 2. In FIG. 2, the capacitor is substantially identical to that of FIG. 1 except that the capacitor is mounted in a different configuration. In FIG. 2 the via, 16, is a partial, or blind, via which is not completely through the substrate, 10. The anode wire, 15, extends into the via and is electrically connected to the anode trace, 21, by a conductive material, 22, such as a conductive paste. A non-conductive paste, 23, can be employed to secure the capacitor to the substrate. The cathode, 13, is in electrical contact with a cathode terminal, 24, preferably by a conductive adhesive, 57.

Figure 3:
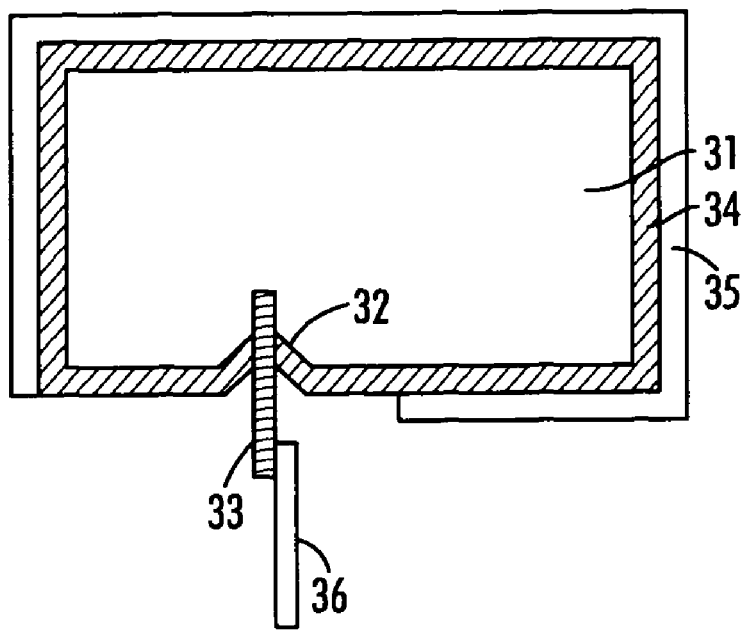
FIG. 3 is a cross-sectional schematic view of an embodiment of the invention.

An embodiment of the present invention is illustrated in and will be described related to FIG. 3. In FIG. 3, the anode, 31, comprises a recess, 32, in the vicinity of the anode wire, 33. As illustrated the dielectric, 34, mimics the shape of the recess, however, this is not necessary. The cathode, 35, is on the dielectric as described above. The recess provides several advantages. One advantage is a space around the anode wire which facilitates laser welding of the anode wire to an adhesion element, 36. The adhesion element may be a wire thereby effectively lengthening the anode wire. The adhesion element may be a solder ball or a heat activated conductive adhesion element which melts upon exposure to laser radiation to conductively adhere the anode wire to the interior of the via. It is also advantageous in some circumstances to treat the anode wire to remove oxides. This is typically done by laser ablation. By having a recess the heat associated with the laser welding, or treating, of the anode wire the heat is better dissipated thereby decreasing the opportunity for anode and/or cathode degradation. Another advantage of the anode recess is the ability to utilize an insulator over that portion of dielectric and/or anode in the area of the anode wire. The recess increases the surface area for bonding between the insulator and dielectric and therefore a stronger bond is formed. The size and shape of the recess is not particularly limiting as long as it protrudes into the body of the anode relative to the face from which the anode wire extends. A "V"-shaped, "U"-shaped, trapezoidal or flat bottomed recess is preferred for manufacturing simplicity.

Figure 4:
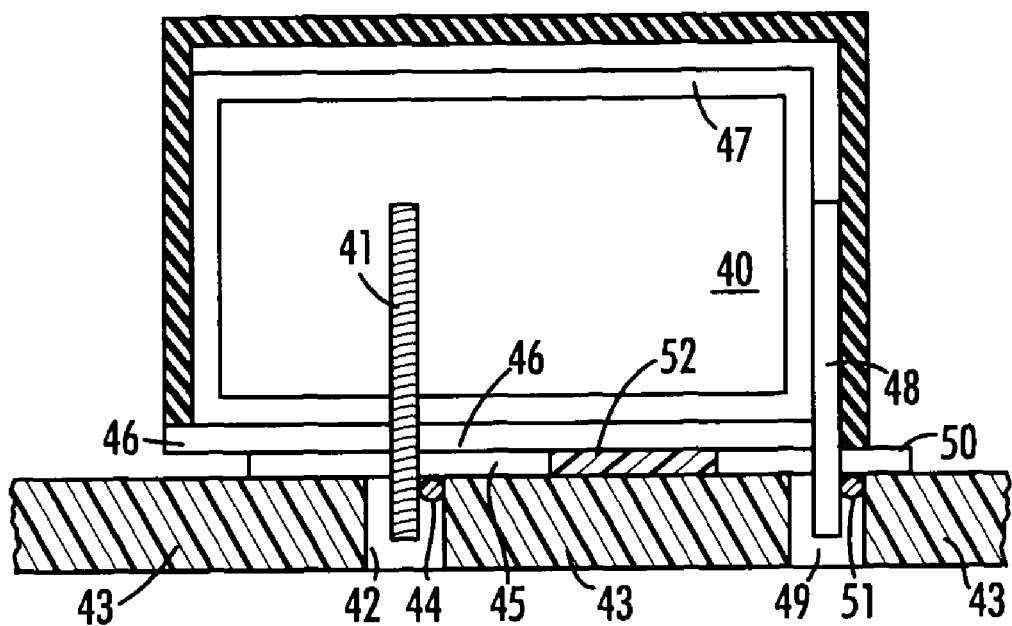
FIG. 4 is a cross-sectional schematic view of an embodiment of the invention.

Another embodiment of the present invention is illustrated in cross-sectional view in FIG. 4. In FIG. 4, the anode wire and a cathode wire extend into a via. The capacitor comprises an anode, 40, with an anode wire, 41, extending downward there from. The anode wire extends into a via, 42, of the substrate, 43. A conductive adhesive, 44, such as a solder ball, in the via electrically connects the anode wire to an anode trace, 45, on the same side of the substrate as the capacitor. An insulator, 46, may be employed as described supra if so desired. A dielectric, 47, is formed on the anode, 40, as described supra. A cathode lead, 48, which is integral to or electrically connected to the cathode layer also extends into a via, 49, and is electrically connected to a cathode trace, 50, by a conductive adhesive, 51, such as a solder ball. A non-conductive adhesive, 52, can be employed for increased adhesion of the capacitor to the substrate. In the embodiment of FIG. 4 it is preferable to utilize through vias since this allows the conductive adhesive to be activated, such as by laser welding, from the side of the substrate which is opposite to the capacitor thereby minimizing the potential for capacitor damage during the mounting process. In the embodiment of FIG. 4 the circuit traces are on the same side of the substrate as the capacitor which minimizes electrical parasitics.

Figure 5:
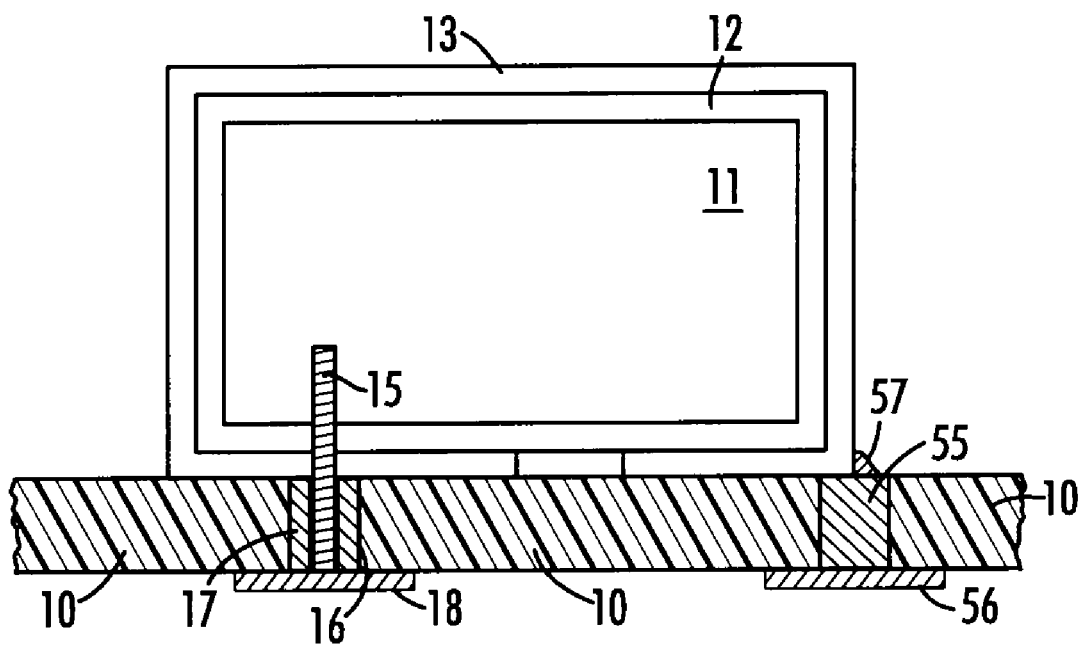
FIG. 5 is a cross-sectional schematic view of an embodiment of the invention.

Another embodiment of the present invention is illustrated in FIG. 5. In FIG. 5, the substrate, 10, anode, 11, dielectric, 12, anode wire, 15, via, 16, conductive adhesive, 17, and anode trace, 18, are as described supra relative to FIG. 1. The cathode, 13, does not cover the bottom of the capacitor thereby allowing the capacitor to be closer to the surface. A conductive via, 55, in the support, 10, allows electrical conductivity from the cathode, 13, to a cathode trace, 56, on the face of the support which is opposite to the capacitor. A conductive adhesive, 57, such as a solder ball can be employed to ensure electrical conductivity between the cathode and conductive via, 55.

The present invention allows for a simplified manufacturing process when preparing discrete capacitors and the resulting capacitors have reduced conductive pathways which is advantageous.

Figure 6:
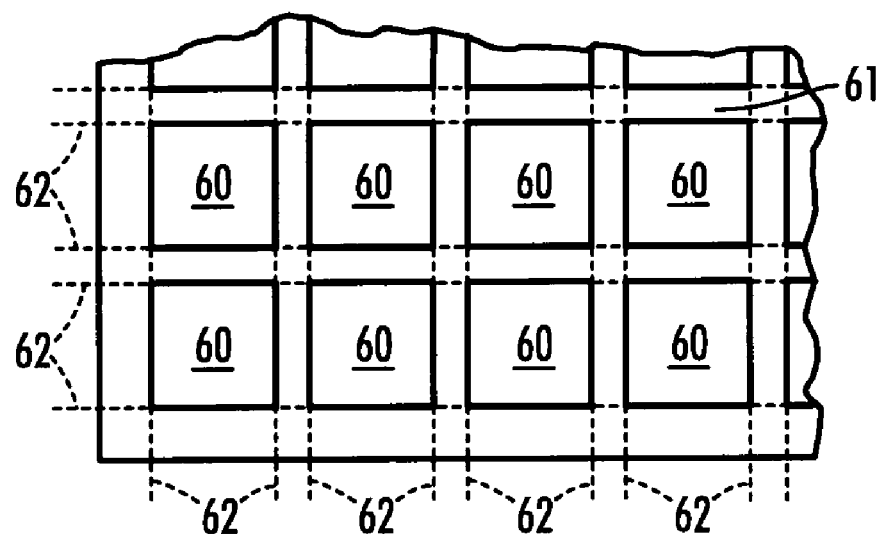
FIG. 6 is a top schematic view of an embodiment of the invention.

As illustrated schematically in top view in FIG. 6, a multiplicity of capacitors, 60, can be applied to a sacrificial substrate, 61. For convenience the capacitors are arranged in a grid pattern though this is not necessary. The capacitors of FIG. 6, are preferably mounted such that the anode and cathode traces are on the opposite face of the substrate and the capacitors preferably comprise an insulating coating either individually or collectively. The capacitors are singulated by dicing along any combination of score lines, 62, thereby forming either a module with multiple capacitors or discrete capacitors as illustrated in cross-section in FIG. 7.

Figure 7:
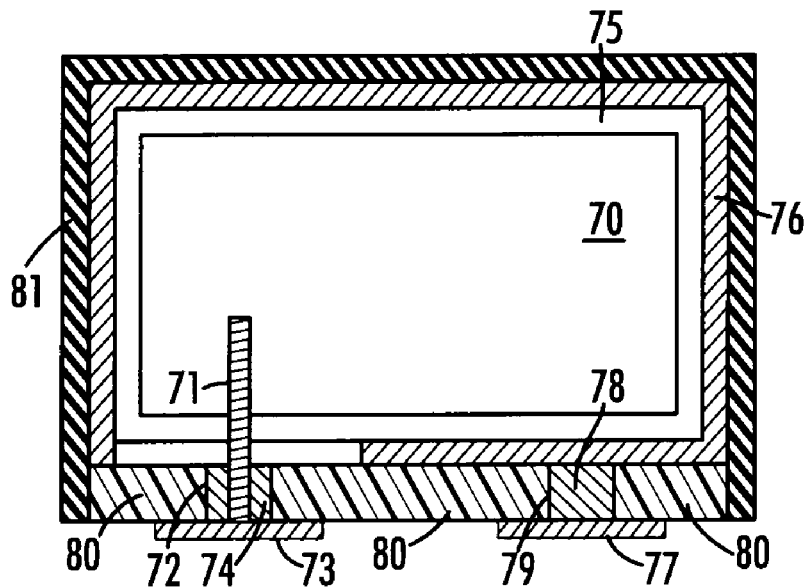
FIG. 7 is a cross-sectional schematic view of an embodiment of the invention.

In FIG. 7, the anode, 70, has an anode wire, 71, extending there from and into a via, 72, in the substrate, 80. The anode wire is in electrical connection with an anode terminal, 73, preferably by a conductive adhesive, 74, in the via. A dielectric layer, 75, is on the surface of the anode. A cathode layer, 76, is on a portion of the surface of the dielectric and in electrical contact with a cathode terminal, 77, preferably with a conductive adhesive, 78, in a via, 79, in the substrate, 80. An optional, but preferred, insulator, 81, protects the capacitor assembly. The capacitor of FIG. 7 can be utilized in a face down application.

The substrate is a non-conductive material as typically employed for circuit boards and the like. Though not limited the substrate is any material commonly employed for substrates. Particularly preferred substrates include polyimide, phenolics butyral, acrylics and modified acrylics, thermoplastic polyimide, epoxy/glass laminates, like FR4, PTFE/woven glass based laminates, glass-reinforced hydrocarbon and ceramic thermoset material with a high glass transition temperature and liquid crystalline polymers. Preferred substrates are substrates with high glass transition temperatures.

Figure 8:
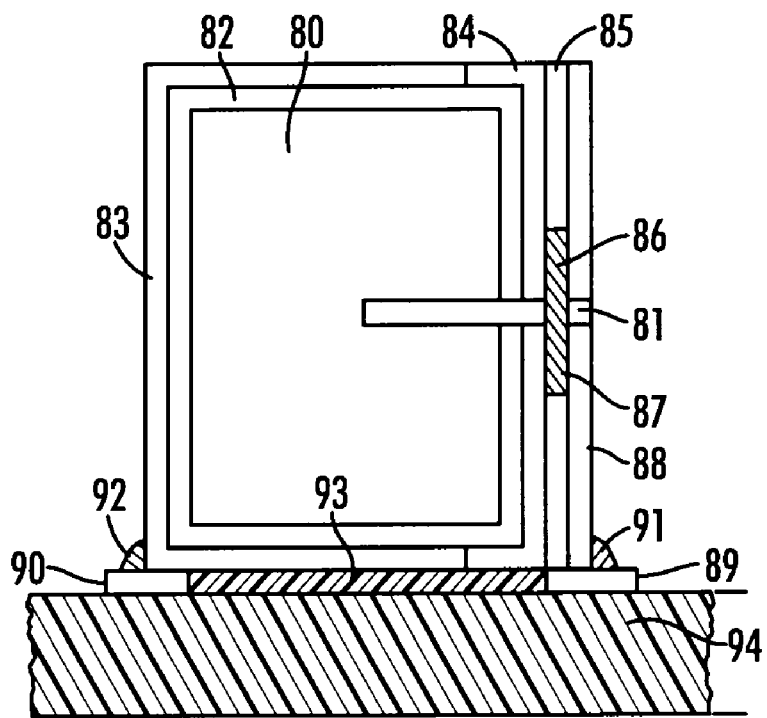
FIG. 8 is a cross-sectional schematic view of an embodiment of the invention.

Another embodiment of the invention is illustrated in cross-sectional schematic view in FIG. 8. In FIG. 8, the anode, 80, has an anode wire, 81, extending there from. A dielectric layer, 82, is on the exterior of the anode. A cathode layer, 83, is on a portion of the dielectric specifically excluding the face from which the anode wire extends. The anode, dielectric and cathode taken together are referred to as the capacitor body. An optional, but preferred, insulator layer, 84, is between a portion of the capacitor body and a substrate, 85. The substrate comprises a via, 86, preferably with a conductive adhesive, 87, therein. The anode wire is in electrical contact with a trace, 88, on the substrate, 85. The trace is preferably as wide as the capacitive body to allow maximum contact with an anode trace on a circuit board. The capacitor is mounted with the anode wire parallel to a circuit board, 94. The circuit board has an anode trace, 89, which is in electrical contact with the trace, 88, of the substrate, 85, preferably by a conductive adhesive, 91. The cathode, 83, is in electrical contact with a cathode trace, 90, preferably by a conductive adhesive, 92. A non-conductive adhesive, 93, can be used to secure the capacitor to the substrate.

The anode is a conductor preferably selected from a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Ta, Nb and NbO with Ta being most preferred. Conductive polymeric materials may be employed as an anode material. Particularly preferred conductive polymers include polypyrrole, polyaniline and polythiophene.

In one embodiment a powder, preferably a valve metal powder, is placed in a press with an anode wire in the powder. The powder is pressed into the proper shape and density to form the unitary anode body with the anode wire extending there from and secured in the anode by compression. Alternatively, the anode wire can be attached to the preformed anode by welding or the like.

The cathode is a conductor preferably comprising at least one of manganese dioxide and a conductive polymeric material. Particularly preferred conductive polymers include polypyrrole, polyaniline and polythiophene. Metals can be employed as a cathode material with valve metals being less preferred. The cathode may include multiple layers wherein adhesion layers are employed to improve adhesion between the conductor and the termination. Particularly preferred adhesion layers include carbon, silver, nickel, tin, copper, or another conductive materials optionally in a binder.

The dielectric is a non-conductive layer which is not particularly limited herein. The dielectric may be a metal oxide or a ceramic material. A particularly preferred dielectric is the oxide of an anode due to the simplicity of formation and ease of use.

The anode wire is a conductive material with, preferably, the same chemical composition as the anode. For the purposes of the present invention the anode wire extends substantially linearly from the anode. The advantages of the present invention are that the anode wire can be directed coupled to the via without a lead frame. The anode wire can comprise a metal or a conductive metal oxide. More preferably the anode comprises a mixture, alloy or conductive oxide of a valve metal preferably selected from Al, W, Ta, Nb, Ti, Zr and Hf. Most preferably the anode comprises at least one material selected from the group consisting of Ta, Nb and NbO with Ta being most preferred. A particularly preferred anode wire for a tantalum anode is a tantalum wire.

In accordance with conventional nomenclature the anode is the positive terminal of a capacitor and the cathode is the negative terminal. With non-valve metal anodes it is preferred that the valve metal be the anode, however, with other conductive materials the capacitor can be reversed with minimal consequence.

The insulator applied to the bottom and or the exterior of the capacitor is a non-conductive material which also preferably has non-wetting or low adhesion properties. The insulator is not limited herein and any insulator known in the art is sufficient for demonstration of the instant invention.

Throughout the description the terms traces and connectors are used interchangeably to refer to a conductive element of a substrate wherein either the anode or cathode of a capacitor is electrically attached to.

Throughout the specification the terms "down", "downward", "bottom" and similar terms refer to the face of the capacitor which is closest to the substrate when mounted to the substrate in accordance with the specification. Other terms, such as "top" and "sides" if used are relative terms defined based on their relationship with the bottom.

For the present application a conductive adhesive is a material which provides some adhesion to two joined components, such as an anode and anode trace, and which allows conductivity of electricity there through. It is preferred that the resistance be as low as possible. The adhesive can be activated by heat, light, or by chemical activation. A particularly preferred conductive adhesive is a solder ball which can be applied to one component to be joined prior to assembly. Once the two components are joined the solder ball is heated to join the components together.

The method of dicing to singulate into discrete capacitors is not particularly limiting herein. The method can include laser cutting, blade cutting, liquid jet cutting and the like.

The present invention has been described with particular reference to the preferred embodiments without limit thereto. One of skill in the art would readily realize additional embodiments and improvements not specifically set forth herein but within the scope of the invention as more specifically set forth in the claims appended hereto.

The invention claimed is:

1. A method of forming a solid electrolytic capacitor comprising:
   forming an anode with an anode wire extending there from;
   forming a dielectric on said anode;
   forming a solid cathode layer as a solid electrolyte directly on said dielectric;
   providing a substrate comprising at least one via;
   providing at least two connectors;
   inserting said anode wire into a first via of said at least one via;
   forming an electrical connection between said anode wire and a first connector of said connectors; and
   forming an electrical connection between said cathode layer and a second connector of said connectors.

2. The method of forming a capacitor of claim 1 further comprising attaching a cathode wire to said cathode layer.

3. The method of forming a capacitor of claim 2 further comprising inserting said cathode wire into a second via of said at least one via.

4. The method of forming a capacitor of claim 1 further comprising forming a recess in said anode.

5. The method of forming a capacitor of claim 4 wherein anode wire passes through said recess.

6. The method of forming a capacitor of claim 1 wherein at least one via is a through via.

7. The method of forming a capacitor of claim 1 wherein at least one connector is on a side of said substrate opposite to said anode.

8. The method of forming a capacitor of claim 1 wherein said anode wire extends from a face of said anode.

9. The method of forming a capacitor of claim 8 wherein said cathode layer is on said face.

10. The method of forming a capacitor of claim 8 further comprising a non-conductive layer on said face.

11. The method of forming a capacitor of claim 1 further including adding an adhesion element to said anode wire.

12. The method of forming a capacitor of claim 11 wherein said adhesion element comprises a conductive wire parallel to said anode wire.

13. The method of forming a capacitor of claim 11 wherein said adhesion element comprises a heat activated adhesive.

14. The method of forming a capacitor of claim 13 wherein said heat activated adhesive comprises solder.

15. The method of forming a capacitor of claim 1 wherein said anode comprises a material or a conductive oxide of said material selected from the group consisting of Al, W, Ta, Nb, Ti, Zr and Hf.

16. The method of forming a capacitor of claim 15 wherein said anode comprises a material selected from Ta, Nb and NbO.

17. The method of forming a capacitor of claim 16 wherein said anode comprises Ta.

18. The method of forming a capacitor of claim 1 further comprising:
   forming a second anode with a second anode wire extending there from;
   forming a second dielectric on said second anode;
   forming a second cathode layer on said second dielectric;
   inserting said second anode wire into a second via;
   forming an electrical connection between said second anode wire and a third connector of said connectors;
   forming an electrical connection between said second cathode layer and a fourth connector of said connectors.

19. The method of forming a capacitor of claim 18 further comprising encapsulating in an insulator.

20. The method of forming a capacitor of claim 18 further comprising separating at least one discrete capacitor.

21. The method of forming a capacitor of claim 1 wherein at least connector is selected from a trace, a via and a solder ball.

22. A method of forming an electronic component comprising:
   forming a solid electrolytic capacitor by:
      forming an anode with an anode wire extending there from;
      forming a dielectric on said anode;
      forming a solid cathode layer directly on said dielectric thereby forming a capacitive element;
      providing a first substrate comprising at least one via; and
      mounting said capacitive element on said first substrate with said anode wire extending into a first via of said at least one via;
   mounting said capacitor and said first substrate on a second substrate with said anode wire parallel to said second substrate wherein said second substrate comprises an anode connector;
   connecting said cathode to a cathode connector;
   electrically connecting said anode wire to said anode connector; and
   electrically connecting said cathode to said cathode connector.

23. The method of forming an electronic component of claim 22 wherein said first substrate further comprises a first connector and said anode wire is electrically connected to said first connector.

24. The method of forming an electronic component of claim 22 wherein said first substrate further comprises a second connector and said cathode is electrically connected to said second connector.

25. The method of forming an electronic component of claim 22 further comprising forming a recess in said anode.

26. The method of forming an electronic component of claim 25 wherein anode wire passes through said recess.

27. The method of forming an electronic component of claim 22 wherein at least one via is a through via.

28. The method of forming an electronic component of claim 22 further including adding an adhesion element to said anode wire.

29. The method of forming an electronic component of claim 28 wherein said adhesion element comprises a conductive wire parallel to said anode wire.

30. The method of forming an electronic component of claim 28 wherein said adhesion element comprises a heat activated adhesive.

31. The method of forming an electronic component of claim 30 wherein said heat activated adhesive comprises solder.

32. The method of forming an electronic component of claim 22 wherein said anode comprises a material or a conductive oxide of said material selected from the group consisting of Al, W, Ta, Nb, Ti, Zr and Hf.

33. The method of forming an electronic component of claim 32 wherein said anode comprises a material selected from Ta, Nb and NbO.

34. The method of forming an electronic component of claim 33 wherein said anode comprises Ta.

* * * * *